United States Patent
Chow et al.

(10) Patent No.: US 9,639,434 B2
(45) Date of Patent: May 2, 2017

(54) AUTO-DIDACTED HIERARCHICAL FAILURE RECOVERY FOR REMOTE ACCESS CONTROLLERS

(71) Applicant: DELL PRODUCTS, L.P., Round Rock, TX (US)

(72) Inventors: Alex Chunghen Chow, Austin, TX (US); Pushkala Iyer, Round Rock, TX (US); Yogesh Prabhakar Kulkarni, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 100 days.

(21) Appl. No.: 14/632,685

(22) Filed: Feb. 26, 2015

(65) Prior Publication Data

US 2016/0253246 A1 Sep. 1, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1464* (2013.01); *G06F 11/1471* (2013.01)

(58) Field of Classification Search
CPC .................................................. G06F 11/1469
USPC .............. 714/26, 27, 2, 15, 16, 48, 20, 47.1
See application file for complete search history.

(56) References Cited

U.S. PATENT DOCUMENTS

| | | | |
|---|---|---|---|
| 6,456,406 B1 | 9/2002 | Arecco et al. | |
| 7,012,918 B2 * | 3/2006 | Williams | H04L 49/9063 370/389 |
| 7,055,052 B2 | 5/2006 | Chalasani et al. | |
| 7,058,968 B2 | 6/2006 | Rowland et al. | |
| 7,549,077 B2 | 6/2009 | White et al. | |
| 7,580,994 B1 * | 8/2009 | Fiszman | H04L 41/08 709/223 |
| 8,885,657 B2 | 11/2014 | Atkinson et al. | |
| 2004/0049669 A1 * | 3/2004 | Schelling | G06F 9/44547 713/2 |
| 2012/0304001 A1 * | 11/2012 | Bakke | G06F 3/061 714/6.24 |

* cited by examiner

*Primary Examiner* — Dieu-Minh Le
(74) *Attorney, Agent, or Firm* — Isidore PLLC (57) ABSTRACT

A method and an information handling system (IHS) provide hierarchical failure recovery for firmware components of the information handling system. According to one aspect, a hierarchical recovery and learning module (HRLM) detects firmware component failure. The HRLM initiates a hierarchical failure recovery by executing recovery sequences from a set of hierarchically ordered recovery sequences. The HRLM determines whether the detected failure was corrected by executing the recovery sequence. If the HRLM further determines that the failure is not corrected by executing the set of hierarchically ordered recovery sequences, the HRLM dynamically generates a new recovery sequence(s) using commands selected from at least one of the previously executed recovery sequences and executes the new recovery sequence(s). If the failure is corrected by a new recovery sequence, the HRLM forwards the particular recovery sequence to a customer support site for use by other systems in addressing similar or identical failures.

26 Claims, 8 Drawing Sheets

| Failure Type | Recovery Sequences Set ID [Order] | Hierarchical Level | Success Rate | Software Assertion |
|---|---|---|---|---|
| Problem 1 | Alpha(1) | I | 412 of 516 | SA [A(1)- A(j)] |
| Problem 1 | Alpha(2) | I | 40 of 70 | SA [A(1)- A(j)] |
| Problem 1 | Alpha(3) new | I | 1 of 1 | SA [A(1)- A(j)] |
| Problem 2 | Beta (1) | II | x of y | SA [B(1)- B(k)] |
| Problem P | Gamma (1) | III | r of s | SA [L(1)- L(m)] |

AUTO-DIDACTED HIERARCHICAL FAILURE RECOVERY FOR REMOTE ACCESS CONTROLLERS

BACKGROUND

1. Technical Field

The present disclosure generally relates to information handling systems (IHS) and in particular to failure detection and recovery within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSes typically includes a number of different hardware components that operate using a set of control/operating code or firmware. The firmware is an integral part of these hardware components and can have varying levels of complexities. As with any piece of software, failure can commonly occur during firmware execution, often as a result of defects in the firmware. Firmware defects can be very serious, especially if the defect affects the operation of components that provide remote and/or network access to/from the IHS or the particular firmware handles critical system management tasks in keeping the server workloads running flawlessly. A typical lifecycle of an issue if detected on field involves information technology (IT) support trying to recreate the exact problem, gathering all analytical information about the problem, looking at any historic data associated with the involved components and suggesting a set of steps to recover from the problem state. These steps can be done by technical support or with the help from an engineering development organization. Once a fix is identified, the fix gets rolled into a future firmware release, and a workaround is applied in the interim.

There are several problems with the above described process. First, the process is ad-hoc. In addition, the IHS, facing the issue, is taken down (stopping processing of active workloads) in order to try out solutions and apply a patch for the workaround. The patches may or may not stick across alternating current (AC) and direct current (DC) cycles, exposing the IHS again to the same or another issue. Furthermore, none of the learnt information from the above process of identifying a patch is archived for application to another system/customer facing a similar issue.

BRIEF SUMMARY

Disclosed are a method and an information handling system (IHS) that provides hierarchical self-healing and auto-didactic recovery for firmware components of an information handling system. According to one aspect, a hierarchical recovery and learning module (HRLM) detects a failure of a firmware component in the IHS. The HRLM initiates a hierarchical failure recovery by executing at least one recovery sequence from a set of hierarchically-ordered recovery sequences, corresponding to the detected failure. Following execution of a recovery sequence, the HRLM performs an evaluation to determine whether the detected failure was corrected by executing the recovery sequence. The HRLM sequentially executes each of the next recovery sequence in the set until the failure is corrected by one of the sequences or until all of the sequences in the set have been executed. The HRLM respectively updates the recovery sequences' success rates which are used to determine an appropriate set of hierarchically ordered recovery sequences for future failure correction. In one embodiment, if none of the sequences in the set of hierarchically-ordered recovery sequences, when executed, causes the failure to be corrected, the HRLM (i) dynamically generates at least one new recovery sequence using commands selected from at least one of the previously executed recovery sequences to extend the set of hierarchically ordered recovery sequences and (ii) executes the new recovery sequence(s) to determine if that new recovery sequence corrects the failure. If the failure is corrected by the new recovery sequence, the HRLM moves the new sequence to the top of the hierarchy within the set of hierarchically-ordered sequences. In another embodiment, the HRLM prompts an administrator to upload a new recovery sequence, if none of the sequences in the set of hierarchically-ordered recovery sequences, when executed, causes the failure to be corrected. In one embodiment, the HRLM forwards the particular recovery sequence to a customer support site to be accessed by other systems to address similar or identical failures.

According to another aspect, in response to the failure being corrected by executing a particular recovery sequence, the HRLM dynamically initiates a learning mechanism that: records information about a respective failure and the particular recovery sequence; enables retrieval of the recorded information for report collection; and forwards the particular recovery sequence to a customer support site which subsequently provides the recovery sequence for download to other systems.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system (IHS) that provide hierarchical failure recovery for firmware components of an information handling system. According to one aspect, a hierarchical recovery and learning module (HRLM) detects firmware component failure. The HRLM initiates a hierarchical failure recovery by executing recovery sequences from a set of hierarchically ordered recovery sequences. The HRLM determines whether the detected failure was corrected by executing the recovery sequence. If the HRLM further determines that the failure is not corrected by executing the set of hierarchically ordered recovery sequences, the HRLM (i) dynamically generates a new recovery sequence(s) using commands selected from at least one of the previously executed recovery sequences and (ii) executes the new recovery sequence(s). If the failure is corrected by a new recovery sequence, the HRLM forwards the particular recovery sequence to a customer support site to be appropriately accessed by other systems.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
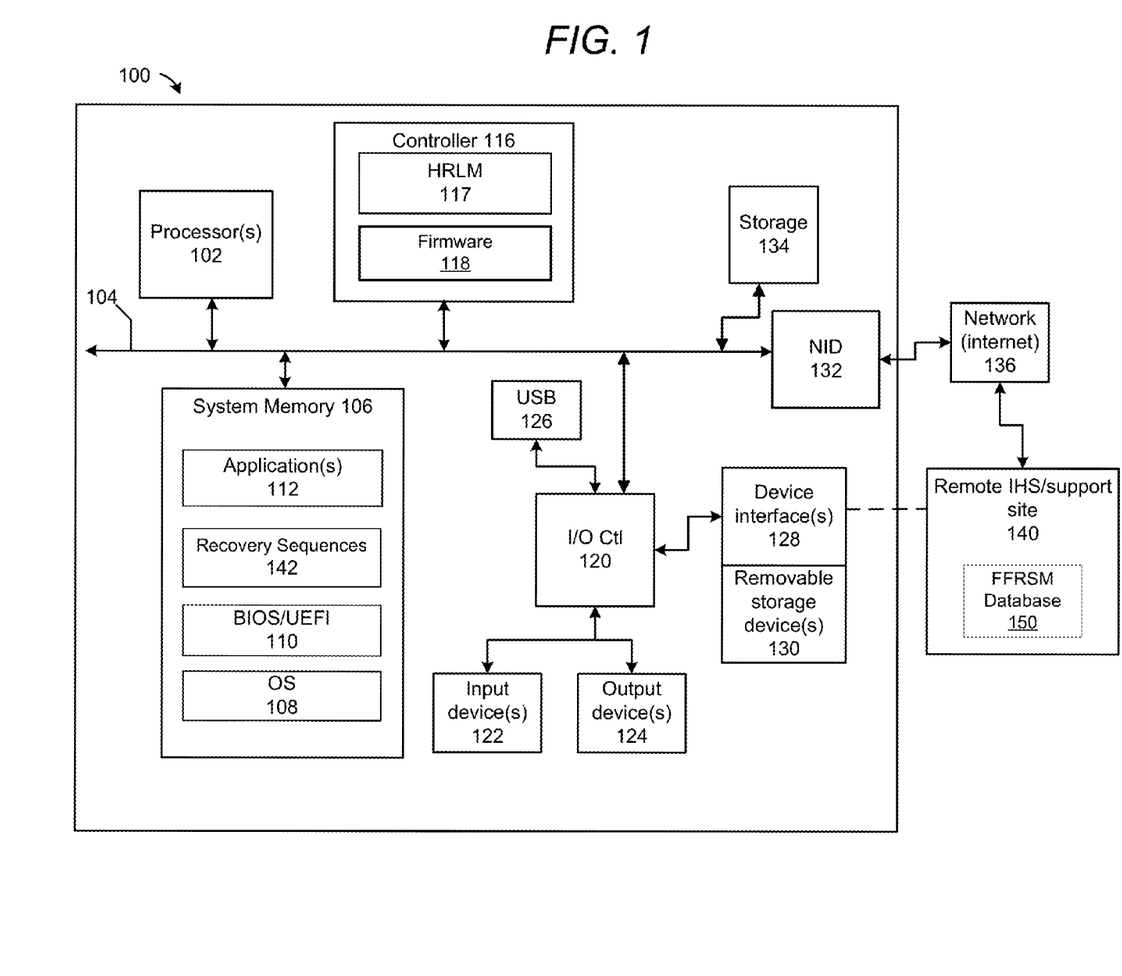
FIG. 1 illustrates an example information handling system (IHS) within which various aspects of the disclosure can be implemented, according to one or more embodiments.
Figure 2:
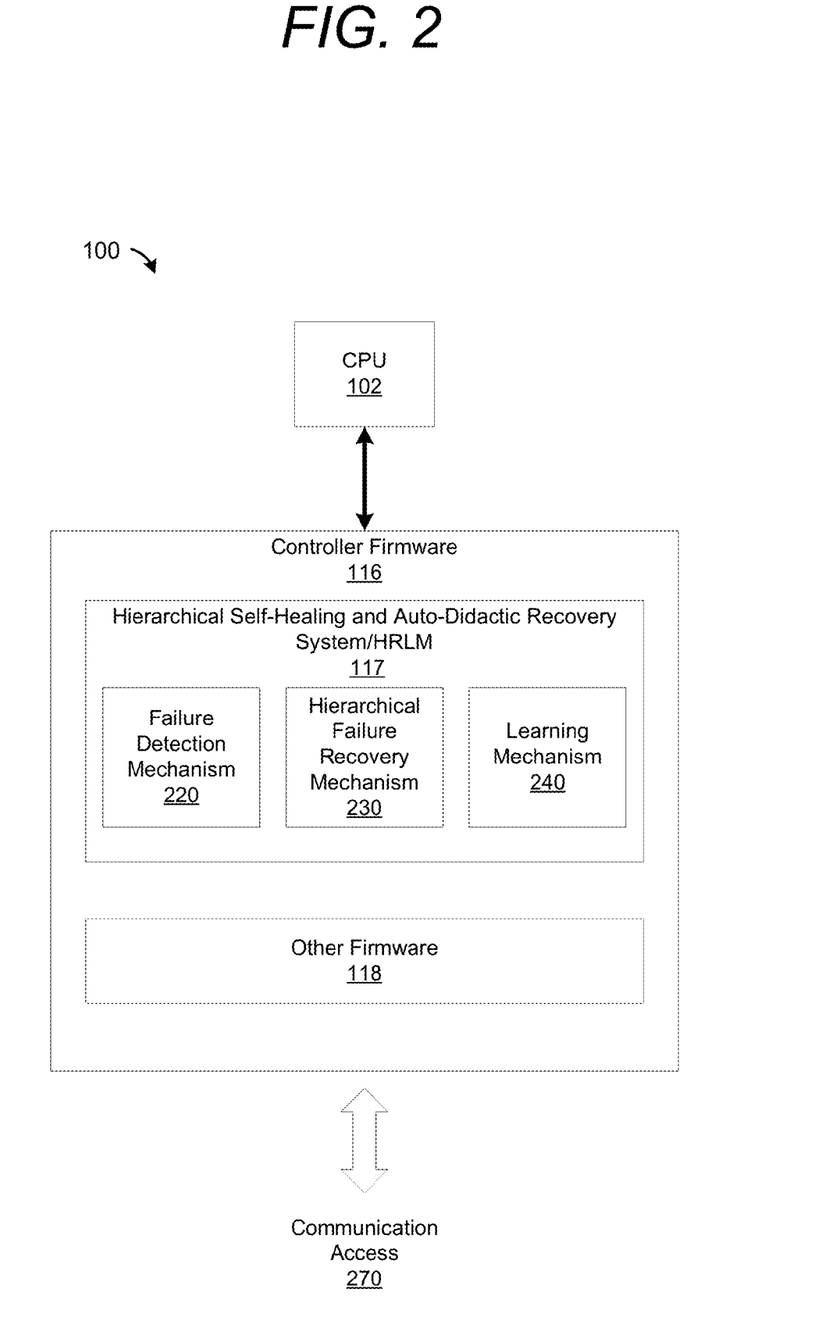
FIG. 2 depicts a hierarchical recovery and learning module (HRLM) and corresponding components within an IHS, according to one or more embodiments.

Those of ordinary skill in the art will appreciate that the hardware, firmware/software utility, and software components and basic configuration thereof depicted in the following figures may vary. For example, the illustrative components of IHS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including Basic Input/Output System (BIOS) 110, operating system (O/S) 108, application(s) 112, recovery sequences 142 for correcting component failure and firmware (not shown). In one or more embodiments, BIOS 110 comprises additional functionality associated with unified extensible firmware interface (UEFI), and can be more completely referred to as BIOS/UEFI 110 in these embodiments. The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as $I^2C$, SMBus, and peripheral component interconnect (PCI) buses.

IHS 100 further comprises controller firmware 116 which is capable of detecting firmware failure in a number of associated devices including within I/O controller 120. As illustrated, controller firmware 116 comprises hierarchical recovery and learning module (HRLM) 117 as well as other firmware component 118.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote/support IHS 140 via an external network, such as network 136. Illustrated within IHS 140 is database 150 which in one embodiment is a firmware failure recovery sequence mapping (FFRSM) database.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

With specific reference now to FIG. 2, there is depicted a hierarchical recovery and learning module (HRLM) and corresponding components within an IHS, according to one or more embodiments. IHS 100 comprises CPU 102 and controller firmware 116. Controller firmware 116 comprises HRLM 117 and other firmware component(s) 118. HRLM 117 further comprises failure detection mechanism 220, hierarchical failure recovery mechanism 230 and learning and reporting mechanism 240.

HRLM 117 provides an extensible failure detection mechanism via assertions. In one embodiment, when new components such as other firmware component 118 are added to controller firmware 116, these new components have new assertions, extending existing failure detection. HRLM 117 can define the assertions for these new components and provide corresponding assertion IDs. In one embodiment, each component has a specific ID and has at least one layer, where each layer corresponds to a respective hierarchical level. Using failure detection mechanism 220, HRLM 117 detects a failure of example controller firmware 116 and/or other firmware component 118 in IHS 100. In particular, HRLM 117 identifies the detected failure by searching within a lookup table using the corresponding assertion IDs. Having identified the failure, HRLM 117 searches for an appropriate failure recovery sequence (FIG. 3) which is used to correct the detected failure.

HRLM 117 initiates a hierarchical failure recovery by executing at least one recovery sequence from a set of hierarchically-ordered recovery sequences 142 (FIG. 1), corresponding to the detected failure. Following execution of a recovery sequence, HRLM 117 performs an evaluation to determine whether the detected failure was corrected by executing the recovery sequence. HRLM 117 sequentially executes each of the next recovery sequence in the set until the failure is corrected by one of the sequences or until all of the sequences in the set have been executed. HRLM 117 respectively updates the recovery sequences' success rates which are used to determine an appropriate set of hierarchically ordered recovery sequences for future failure correction. However, if HRLM 117 further determines that the failure was not corrected by executing the set of hierarchically ordered recovery sequences (i.e., after having executed a last recovery sequence in the set of hierarchically-ordered recovery sequences), HRLM 117 dynamically generates at least one new recovery sequence using commands selected from at least one of the previously executed recovery sequences to extend the set of hierarchically ordered recovery sequences. HRLM 117 then executes the new recovery sequence(s) to determine if that new recovery sequence corrects the failure.

HRLM 117 updates, based on performed evaluations, one or more metrics respectively associated with a success rate of the one or more executed recovery sequences relative to each other in resolving detected failures. HRLM 117 utilizes these metrics to provide an updated set of hierarchically ordered recovery sequences appropriate for addressing a future failure.

In one embodiment, in response to the failure being corrected by executing a particular recovery sequence, HRLM 117 dynamically initiates a learning mechanism that: records information about a respective failure and the particular recovery sequence; enables retrieval of the recorded information for report collection; and forwards the particular recovery sequence to a customer support site which subsequently provides the recovery sequence for download to other systems.

In one embodiment, HRLM 117 hierarchically orders the recovery sequences based on dependencies between various layers representing different hierarchical layers in an IHS. For example, many service providers and consumers are associated with the different layers of cloud computing which consist of software as a service (SaaS), platform as a service (PaaS) and infrastructure as a service (IaaS). A service level agreement (SLA) is a basis of relations between service provider and consumer in the different layers of cloud computing. Both service provider and consumer can monitor the agreed services for validating the SLA. Each layer can also have an SLA which is associated with and/or dependent upon an SLA from another layer. Thus, an IHS operating in a cloud computing environment can include firmware which supports different degrees of involvement on the various system/computing hierarchical layers/levels, based on dependencies between the various layers. Service provider and consumers can monitor firmware components associated with agreed services for failures/problems. A failure recovery sequence accounts for an extent of an involvement in each computing layer and dependencies between the various layers.

Figure 3:
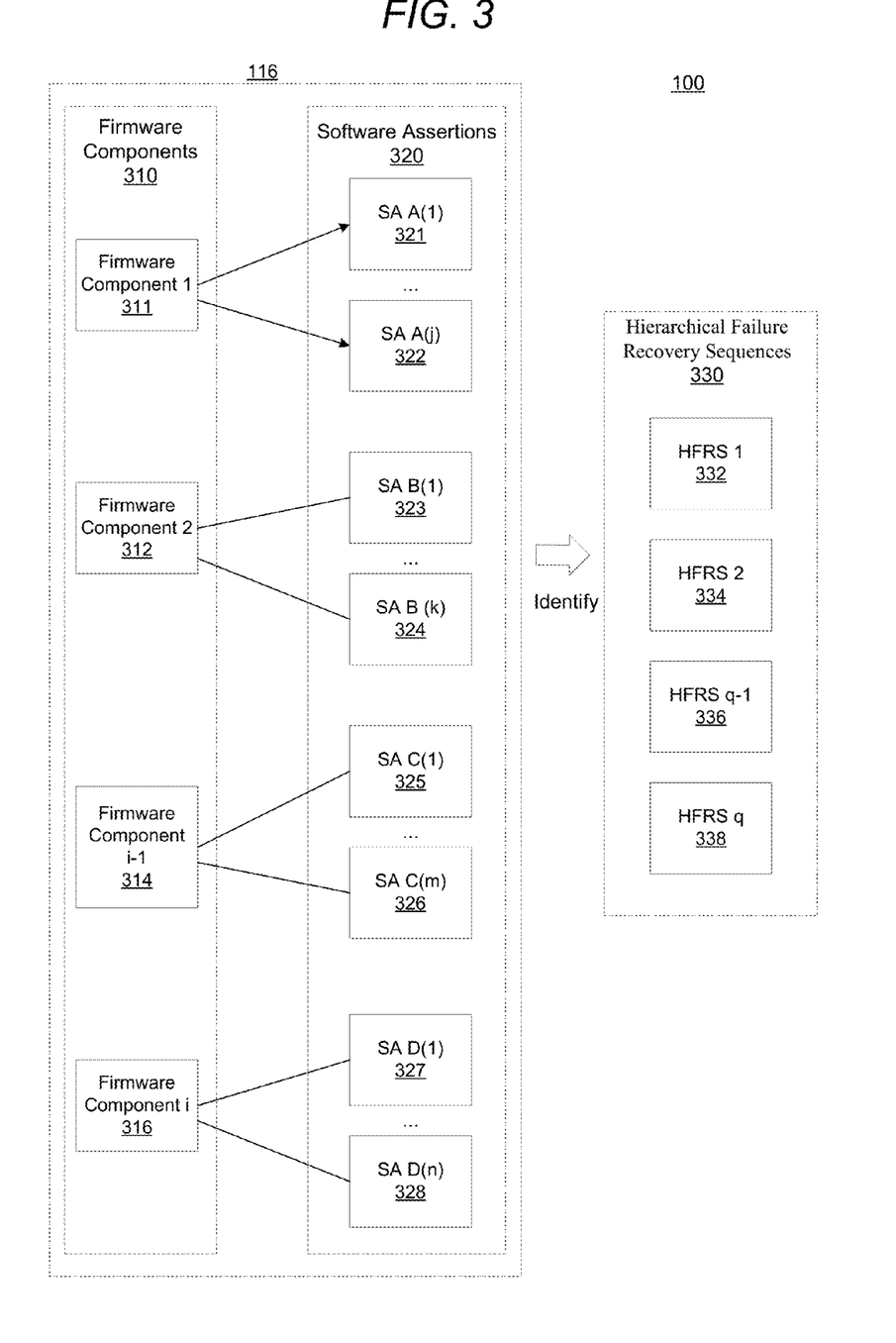
FIG. 3 illustrates a number of firmware components, the software assertions used to detect firmware component failure, and the corresponding hierarchical firmware recovery sequences, according to one embodiment.

FIG. 3 illustrates a number of firmware components, the software assertions used to detect firmware component failure, and the corresponding hierarchical firmware recovery components, according to one embodiment. IHS 100 comprises controller firmware 116 which further comprises firmware components set 310. Firmware components set 310 includes firmware component 1 311, firmware component 2 312, firmware component i-1 314 and firmware component i 316. IHS 100 also comprises software assertions set 320 comprising software assertions 321-328 which are inserted into respective layers and/or hierarchical levels of corresponding firmware components. In addition, IHS 100 comprises hierarchical failure recovery sequences (HFRS) set 330. HFRS set 330 comprises HFRS 1 332, HFRS 2 334, HFRS q-1 336 and HFRS q 338.

The set of software assertions 320 are respectively included within and/or utilized by firmware components 310 to detect corresponding firmware component failures. For example, firmware component 1 311 utilizes software assertions SA A(1) 321-SA A(j) 322 to detect one or more failures, as illustrated within IHS 100. As indicated, HRLM 117 (FIGS. 1-2) utilizes the software assertion to determine whether the respective firmware component is working properly. In response to detecting a firmware component failure, HRLM 117 determines whether a hierarchical failure recovery sequence 330 associated with the software assertion ID is available to address the detected failure. Using the hierarchical failure recovery sequence, HRLM 117 attempts to correct the failure of the firmware component. The hierarchical failure recovery sequence (HFRS) is associated with a detected and identified failure and represents an appropriate (i.e., highest priority based on success rating) recovery sequence. This association/mapping of detected failure and recovery sequence represents a tuple which can be used to access within a table or database the set of hierarchically ordered recovery sequences which includes the highest priority recovery sequence. The highest priority recovery sequence is a first recovery sequence from the set to be executed to attempt to correct the detected failure. Furthermore, in one embodiment, HRLM 117 places IHS 100 into a "self-healing" state as HRLM 117 initiates execution of one or more hierarchically-ordered recovery sequences to attempt to correct the failure.

According to one aspect, HRLM 117 can generate an output indicating that the failure has been detected. For example, in one embodiment, HRLM 117 indicates that a failure has occurred by displaying a message on a screen of the information handling system indicating that a failure has been detected and the information handling system is entering the self-healing mode. In another embodiment, HRLM 117 activates an LED that indicates that the information handling system is in the self-healing mode.

Figure 4:
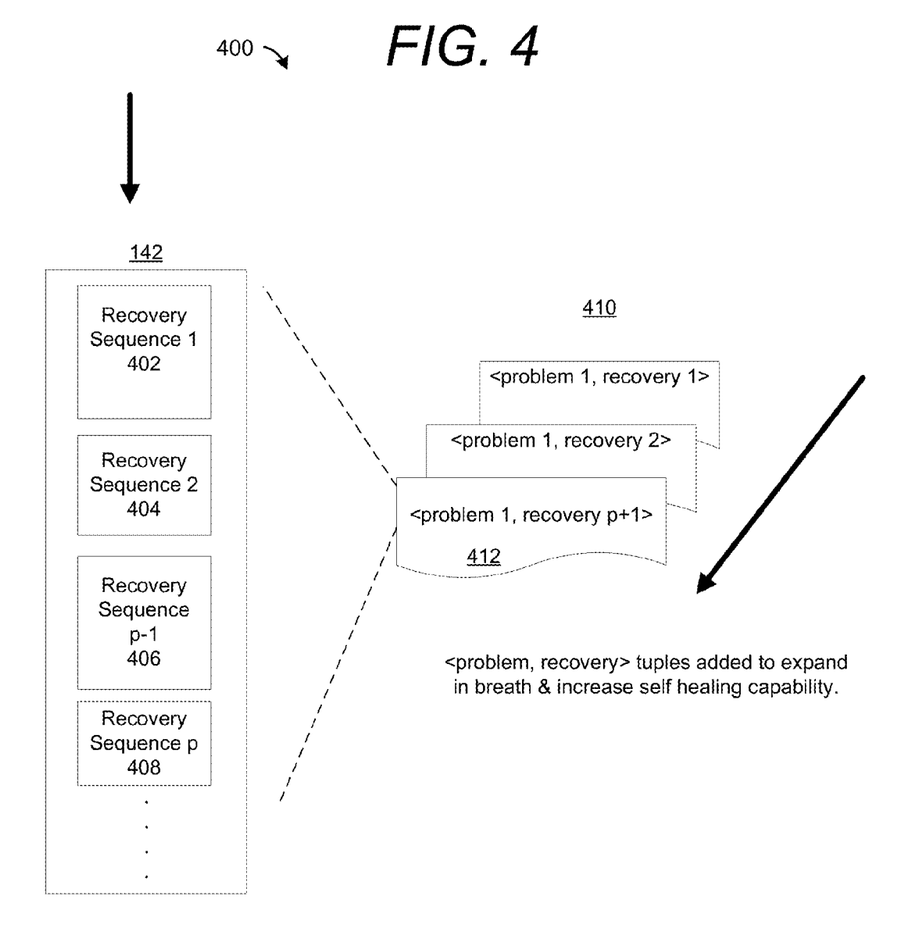
FIG. 4 illustrates a hierarchical recovery environment showing recovery sequences that are applied to a problem associated with a detected failure, according to one embodiment.

FIG. 4 illustrates a hierarchical recovery environment showing recovery sequences that are applied to a problem associated with a detected failure, according to one embodiment. Environment 400 comprises a set of hierarchical recovery sequences 142 which initially includes recovery sequences 1 402, 2 404, p-1 406 and p 408. In one embodiment, a set of hierarchically ordered recovery sequences correspond to a recovery action and a given recovery sequence can comprise a single hook or can have multiple hooks, where each hook identifies one command or a set of (multiple) commands to resolve the problem. Environment 400 also includes a set of tuples 410 which represent information associating failures and recovery sequences. More particularly, tuples 410 provide information which respectively associates failures/problems with recovery sequences that are able to correct a corresponding, detected failure. Tuples 410 include several tuples of which tuple 412 is particularly illustrated.

Figure 6:
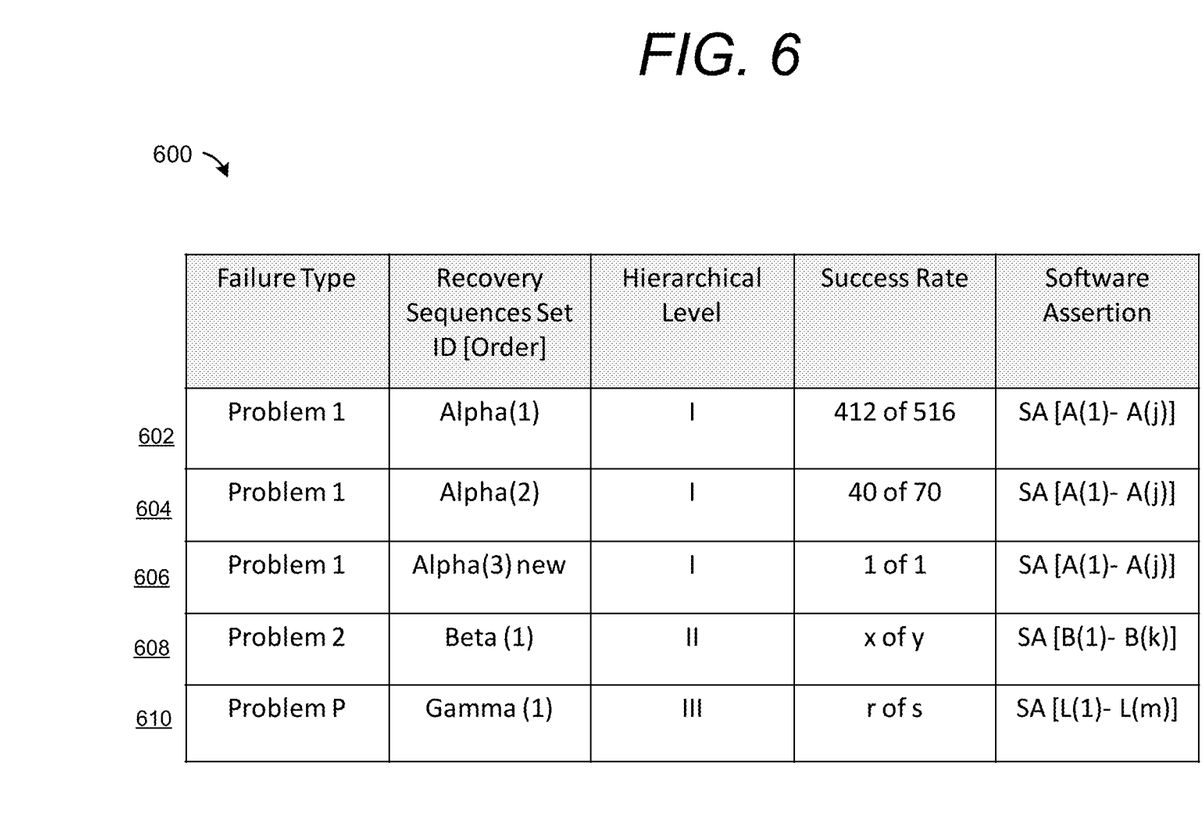
FIG. 6 illustrates a table which provides a record of detected problems, the software assertions used to detect corresponding failures, the applied recovery sequences and corresponding success rates, according to one embodiment.

HRLM 117 executes recovery sequences in hierarchical order from the set of hierarchical recovery sequences 142. Thus, HRLM 117 first executes first recovery sequence 402 to attempt to correct the detected failure of firmware components of controller firmware 116 (FIGS. 1-3). First recovery sequence 402 represents a recovery sequence that is most likely to correct the detected failure based on a dynamically updated success rate (FIG. 6). HRLM 117 determines whether the detected failure was corrected by executing first recovery sequence 402. If the detected failure was corrected by executing first recovery sequence 402, HRLM 117 returns IHS 100 to a normal state. However, if HRLM 117 determines that the detected failure was not corrected by executing first recovery sequence 402, HRLM 117 executes a next recovery sequence which is second recovery sequence 404. Thus, as indicated, HRLM 117 can sequentially apply each recovery sequence of multiple recovery sequences to a given problem/failure, where the first recovery sequence executed is the recovery sequence in which HRLM 117 places a highest "confidence" for correcting the failure. HRLM 117 performs the processes of executing a recovery sequence from the initial set of recovery sequences 142 followed by evaluating the firmware component via respective software assertions (FIG. 3) until HRLM 117 determines via an evaluation that a preceding executed recovery sequence corrected the detected failure or that all of the recovery sequences from the initial set has been executed.

If HRLM 117 determines that the failure was not corrected by executing the set of hierarchically ordered recovery sequences 142, HRLM 117 dynamically generates at least one new recovery sequence using commands selected from at least one of the previously executed recovery sequences to extend the set of hierarchically ordered recovery sequences 142. HRLM 117 then executes the new recovery sequence(s). HRLM 117 determines whether the detected failure has been corrected by executing the new recovery sequence. In response to determining that the detected failure has been corrected by executing the new recovery sequence, HRLM 117 stores as a tuple (e.g., tuple 412) information associating the specific firmware failure with the new recovery sequence that corrected the failure. HRLM 117 initiates a learning mechanism which uses the new tuple 412 to publish an association of the detected failure and the new recovery sequence to a support site to share via download with other information handling systems.

However, if HRLM 117 determines that the detected failure has not been corrected by executing the new recovery sequence, HRLM 117 performs the processes of generating and executing a new recovery sequence followed by evaluating the firmware component via respective software assertions (FIG. 3) until HRLM 117 determines via an evaluation that a new recovery sequence corrected the detected failure or that a pre-established limit for a number of new recovery sequences that are generated has been reached. In such a case, HRLM 117 can initiate a shutdown process within IHS 100 until a permanent fix can be applied to the detected failure. In particular, HRLM 117 initiates an orderly shutdown of the information handling system, and when the information handling system cannot initiate an orderly shutdown, the information handling system is forced to shut down.

As indicated in FIG. 4 via tuple 412, a new recovery sequence (not shown) is generated and indexed as p+1 within the hierarchical ordering of recovery sequences. In one embodiment, when the new recovery sequence was able to correct the detected failure, the new recovery sequence is placed at the top or first position within the hierarchical ordering of recovery sequences within the set. In one embodiment, HRLM 117 identifies the new recovery sequence that is successful in resolving the failure and generates a new tuple using learning mechanism 240 and publishes the tuple to the support site so that the tuple can be accessed by other IHSs.

Figure 5:
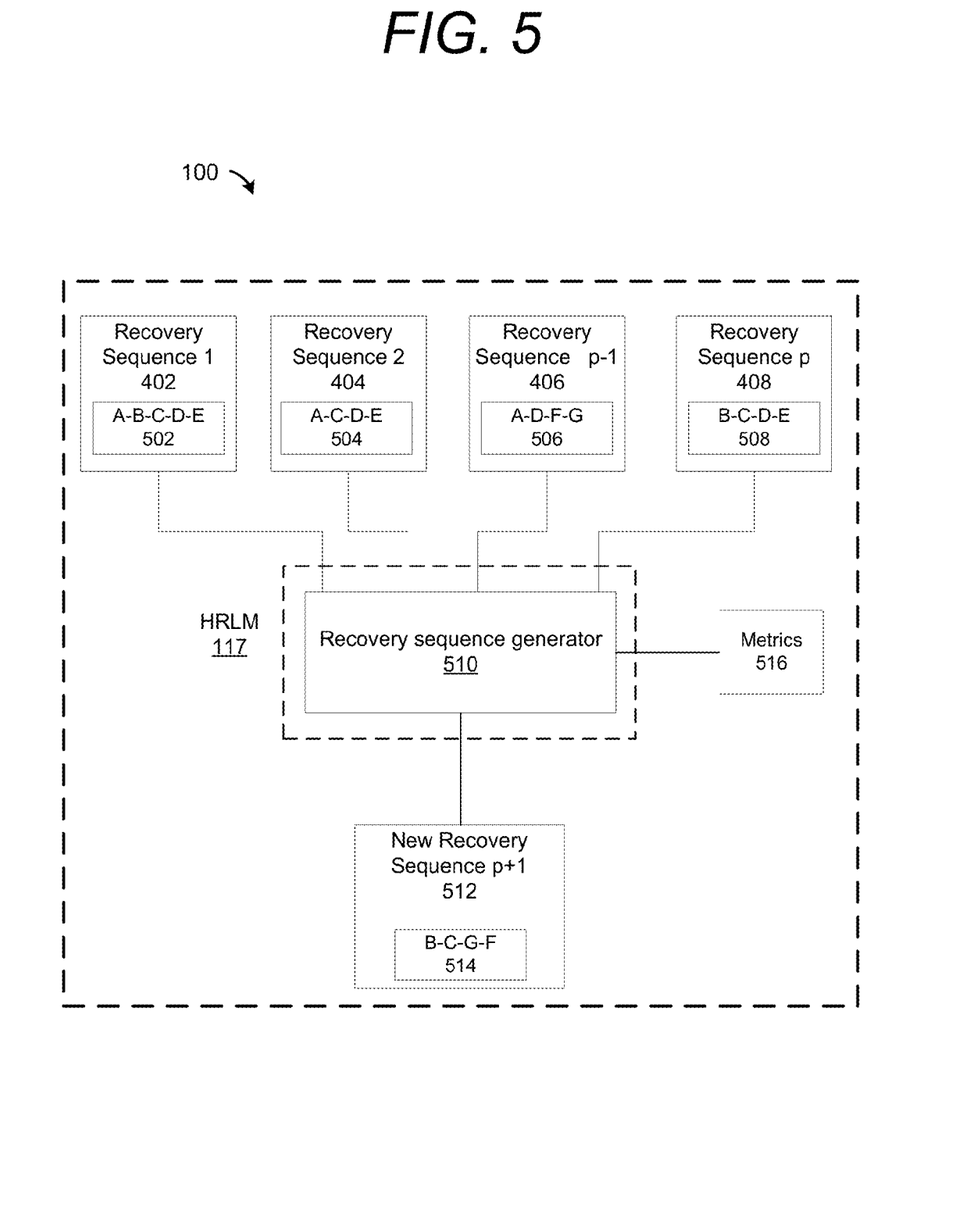
FIG. 5 illustrates a set of hierarchically ordered recovery sequences which is extended to create a new recovery sequence by using a selectively ordered series of executable commands, according to one embodiment.

FIG. 5 illustrates a set of hierarchically ordered recovery sequences, which set is extended to include a newly-created new recovery sequence by using a selectively ordered series of executable commands within the IHS, according to one embodiment. IHS 100 comprises an initial set of hierarchically-ordered recovery sequences 402, 404, 406, 408. As illustrated, each sequence comprises a series of commands. More particularly, each sequence comprises a specific group of commands arranged in a selected order to provide a particular series of commands for each recovery sequence. For example, first recovery sequence 402 comprises first series 502 which provide a specifically ordered command series "A-B-C-D-E", and second recovery sequence 404 comprises second series 504 which provide a specifically ordered command series "A-C-D-E". IHS 100 also includes recovery sequence generator 510. Additionally, IHS 100 comprises new recovery sequence p+1 512 which HRLM 117 generates using recovery sequence generator 510. Also illustrated in IHS 100 are metrics 516, which HRLM 117 uses to select a specific order for a group of commands that constitute generated, new recovery sequence p+1 512.

HRLM 117 also provides an extensible hierarchical failure recovery mechanism via recovery sequences and/or hooks. When HRLM 117 detects a failure and there is no corresponding hierarchical failure recovery sequence set, HRLM allows a developer to upload one or more recovery sequences and extend an existing and/or uploaded recovery mechanism. HRLM 117 allows commands in a given recovery sequence to be weighted (i.e., given a specific level of importance) using a success rate metric, which is updated based on recovery sequence results history. A given problem identified by an assertion ID can have more than one recovery sequence, with the most successful recovery sequence being the first one ordered in the set of hierarchically ordered recovery sequences. HRLM 117 also provides an extensible and continuously learning mechanism that keeps adding tuples associating detected failures and successful recovery sequences (i.e., executed recovery sequences that correct a detected failure), as the tuples are identified.

As illustrated in FIG. 5, HRLM 117 retrieves the set of hierarchically ordered recovery sequences using recovery sequence generator 510. In one embodiment, HRLM 117 retrieves a first recovery sequence from the set of hierarchically ordered recovery sequences instead of the entire set. HRLM 117 selects a portion of commands from at least one of the previously executed recovery sequences to create each of at least one new sequence. HRLM 117 selectively orders the portion of executable commands to provide at least one corresponding newly-ordered series of executable commands. For example, HRLM 117 selects commands B, C, F and G, which HRLM 117 orders/arranges as a series of commands B-C-G-F which is illustrated as B-C-G-F 514 within new recovery sequence 512. In one embodiment, HRLM 117 respectively orders selected executable commands by applying one or more metrics associated with at least one of (a) success rates of various recovery sequences having executable commands, (b) a type of failure of the firmware component, and (c) a priority associated with the identified failure which, in one embodiment is associated with a hierarchical level of the correction. Each of at least one series of executable commands is a corresponding new recovery sequence, such as new recovery sequence p+1 512, and each differs from any other series of executable commands with respect to at least one of (a) constituent executable commands and (b) an ordering of the constituent executable commands.

FIG. 6 illustrates a table which provides a record of detected problems/failures, the software assertions used to detect corresponding failures, the applied recovery sequences and corresponding sequence success rates, according to one embodiment. Table 600 comprises five (5) columns. The first column identifies specific firmware failures that have been detected by HRLM 117. The second column respectively identifies the set of hierarchical recovery sequences that HRLM 117 has applied to the detected failures. The second column further indicates whether a new sequence was utilized. The third column identifies the hierarchical level of the firmware component at which the failure was detected. The fourth column provides the success rate of the applied sequences to the respective failures. The fifth column identifies the software assertions used to detect the failures.

First row 602 indicates that failure "Problem 1" which was detected at hierarchical level I of controller firmware 116 using software assertions A(1)-A(j) and that recovery sequence "Alpha(1)" having an order of "1" was applied first to the detected failure "Problem 1". Recovery sequence "Alpha(1)" has a success rate of approximately 80% (i.e., 412/516) with respect to Problem 1 but failed to correct the failure in this case. Table 600 indicates via third row 606 that the detected failure was corrected using newly generated recovery sequence "Alpha (3)" having a 100% success rate. In one embodiment, HRLM 117 places new recovery sequence Alpha (3) as a first recovery sequence having a highest priority in a subsequently updated set of hierarchically ordered recovery sequences corresponding to Problem 1.

Figure 7:
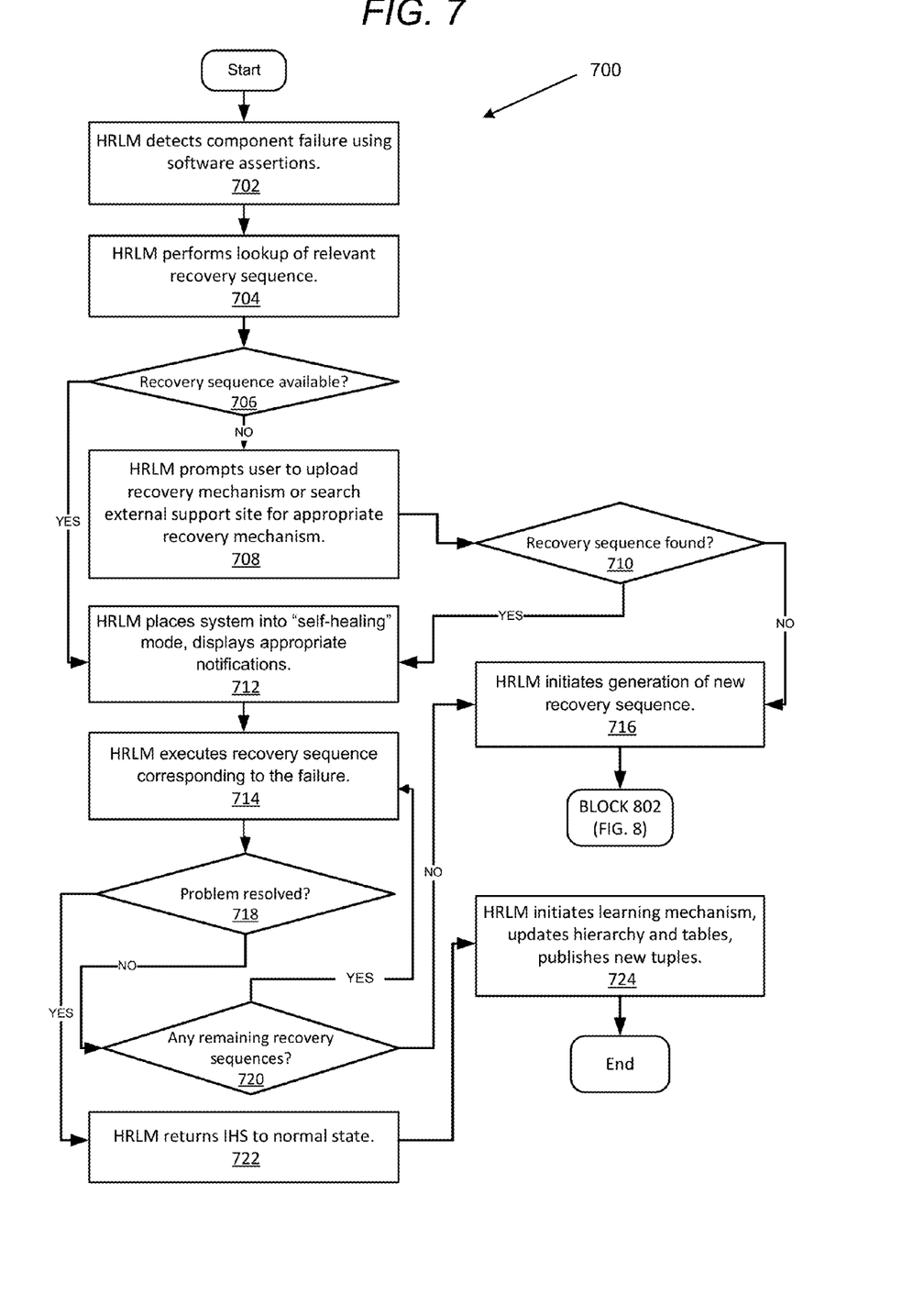
FIG. 7 is a flow chart illustrating a method for detecting firmware component failures and for executing a hierarchical recovery mechanism to correct the failure, according to one embodiment.
Figure 8:
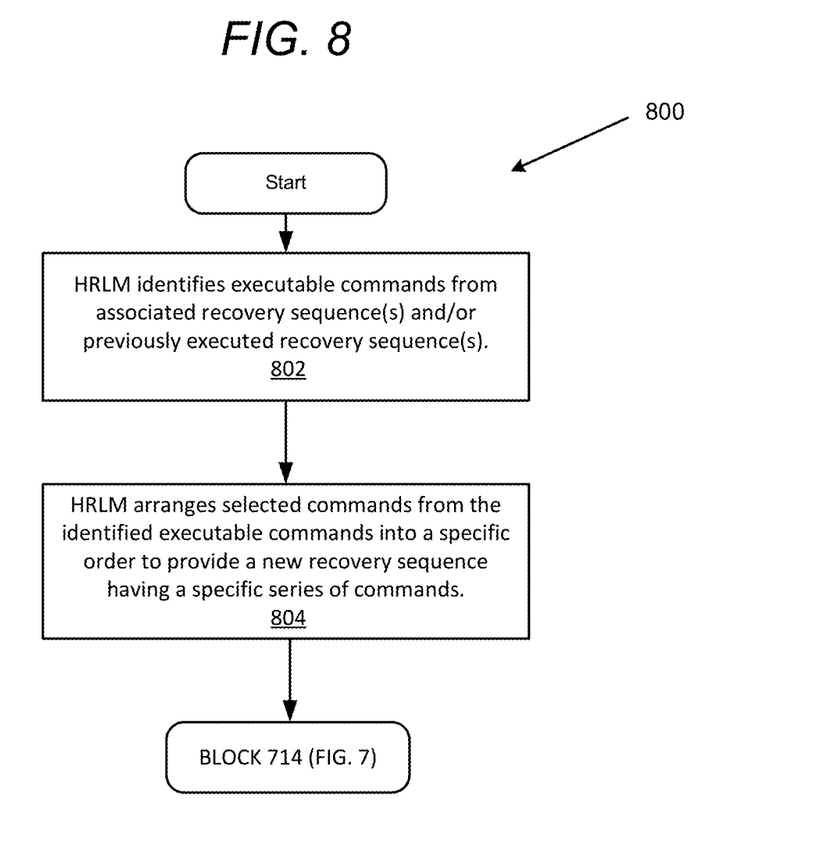
FIG. 8 is a flow chart illustrating a method for dynamically generating a new recovery sequence using constituent commands from pre-established recovery sequences, in accordance with one or more embodiments.

FIG. 7 and FIG. 8 present flowcharts illustrating example methods by which IHS 100 and specifically HRLM 117 presented within the preceding figures perform different aspects of the processes that enable one or more embodiments of the disclosure. Generally, method 700 and method 800 collectively represent methods for detecting firmware component failures and correcting the failures within IHS 100. The description of each method is provided with general reference to the specific components illustrated within the preceding figures. It is appreciated that certain aspects of the described methods may be implemented via other processing devices and/or execution of other code/firmware. In the discussion of FIG. 7 and FIG. 8, reference is also made to elements described in FIGS. 1-6.

FIG. 7 is a flow chart illustrating a method for detecting firmware component failures and for executing a hierarchical recovery mechanism to correct the failure, according to one embodiment. Method 700 begins at the start block and proceeds to block 702 at which HRLM 117 detects component failure using software assertions. HRLM 117 performs a lookup of relevant recovery sequences based on the (identifying information associated with the) detected failure (block 704). HRLM 117 determines whether an appropriate recovery sequence is available (decision block 706). If the appropriate recovery sequence is not (locally) available, HRLM 117 triggers a search of a network-accessible (external) support site for an appropriate recovery sequence/mechanism or prompts a user/administrator to upload a recovery sequence/mechanism (block 708). HRLM 117 determines whether a corresponding recovery sequence has been accessed/found (decision block 710). If the corresponding recovery sequence has been accessed/found, HRLM 117 initiates a self-healing state (block 712). If the corresponding recovery sequence has not been accessed/found, HRLM 117 initiates generation of a new recovery sequence (block 716) and then proceeds to block 802 (FIG. 8).

However, if the appropriate recovery sequence is (locally) available, HRLM 117 places IHS 100 into the "self-healing" mode which initiates displays of appropriate notifications (block 712). HRLM 117 executes the recovery sequence corresponding to the failure (block 714). HRLM 117 determines whether the detected failure/problem has been resolved as a result of executing the recovery sequence (decision block 718). If the detected failure/problem has not been resolved by executing the recovery sequence, HRLM 117 determines whether there are any recovery sequences from the set remaining to be executed (decision block 720). However, if the detected failure/problem has been resolved by executing the recovery sequence, HRLM 117 returns IHS 100 to a normal state (block 722). HRLM 117 initiates a learning mechanism which uses the new tuple 412 to publish an association of the detected failure and the new recovery sequence that resolved a detected failure to a support site to share via download with other information handling systems (block 724). The process concludes at the end block.

FIG. 8 is a flow chart illustrating a method for dynamically generating a new recovery sequence using constituent commands from pre-established recovery sequences, in accordance with one or more embodiments. Method 800 begins at the start block and proceeds to block 802 at which HRLM 117 identifies executable commands from associated recovery sequence(s) and/or previously executed recovery sequence(s) (block 802). HRLM 117 arranges selected commands from the identified executable commands into a specific order to provide a new recovery sequence having a specific series of commands (block 804). Method 800 then proceeds to block 714 (FIG. 7).

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of hierarchical self-healing and auto-didactic recovery for firmware components of an information handling system having a central processing unit (CPU), the method comprising:
detecting a failure of a firmware component in the information handling system;
initiating a hierarchical failure recovery by executing at least one recovery sequence from a set of hierarchically ordered recovery sequences, corresponding to the detected failure;
following execution of a recovery sequence, performing, before executing a next recovery sequence, an evaluating to determine whether the detected failure was corrected by executing the recovery sequence;
in response to the failure not being corrected by executing the set of hierarchically ordered recovery sequences:
dynamically generating at least one new recovery sequence using commands selected from at least one of the previously executed recovery sequences in order to extend the set of hierarchically ordered recovery sequences, wherein dynamically generating includes selecting a portion of commands from the at least one of the previously executed recovery sequences to create the at least one new recovery sequence;
executing the at least one new recovery sequence; and
selectively ordering the executable commands corresponding to each of the at least one new recovery sequence, respectively, to provide at least one corresponding series of executable commands;
wherein each of the at least one series of executable commands differ from any other series of executable commands with respect to at least one of (a) constituent executable commands and (b) an ordering of the constituent executable commands, wherein each of the at least one series of executable commands is a corresponding new recovery sequence.

2. The method of claim 1, further comprising:
updating, based on performed evaluations, one or more metrics respectively associated with a success rate of the one or more executed recovery sequences relative to each other in resolving the detected failure, wherein the one or more metrics are utilized to provide an updated set of hierarchically ordered recovery sequences appropriate for addressing a future failure.

3. The method of claim 1, further comprising:
in response to the failure being corrected by executing the recovery sequence, dynamically initiating a learning mechanism that: records information about a respective failure and at least one corresponding recovery sequence; enables retrieval of the recorded information for report collection; and forwards the particular recovery sequence to a customer support site which subsequently provides the recovery sequence for download to other systems.

4. The method of claim 3, further comprising:
in response to establishing that the new recovery sequence, having a specific series and group of commands, corrects the failure, recording information identifying the new recovery sequence associated with the detected failure of the firmware component, and which includes a type of failure of the firmware component and a hierarchical level of the correction.

5. The method of claim 1, further comprising:
retrieving the set of hierarchically ordered recovery sequences.

6. The method of claim 1, further comprising:
respectively ordering selected portions of the executable commands by applying one or more metrics associated with at least one of success rates of various recovery sequences having executable commands, a type of failure of the firmware component, and a priority associated with the identified failure.

7. The method of claim 1, further comprising:
verifying whether the detected failure has been corrected by executing a new recovery sequence; and
in response to verifying that the detected failure has been corrected:
storing information associating the specific firmware failure with the new recovery sequence that corrected the failure; and
publishing an association of the detected failure and the new recovery sequence to a support site to share via download with other information handling systems.

8. The method of claim 1, wherein the recovery sequences are hierarchically ordered based on inter-layer system component dependencies, where various layers represent respective hierarchical levels.

9. The method of claim 1, wherein:
detecting a failure of a firmware component further comprises inserting at least one software assertion in the firmware component, wherein the software assertion can determine whether the firmware component is working properly; and
once a failure is detected, the method further comprises:
identifying whether at least one hierarchical failure recovery sequence is available for that detected failure; and
generating an output indicating that the failure has been detected.

10. The method of claim 9, wherein generating an output indicating that a failure has been detected comprises one or more of:
displaying a message on a screen of the information handling system indicating that a failure has been detected and the information handling system is entering in the self-healing mode; and
activating an LED that indicates that the information handling system is in the self-healing mode.

11. The method of claim 10, further comprising:
in response to not being able to identify a hierarchical failure recovery sequence for the detected failure, performing one or more of:
prompting a user to manually select a hierarchical failure recovery sequence from a FFRSM database that may correct the failure;
prompting the user to select an information handling system shutdown;
displaying a message to indicate that the failure is not recoverable and a new hierarchical failure recovery sequence is required.

12. The method of claim 1, wherein searching for the one or more recovery sequences that corresponds with the failure further comprises:
identifying the recovery sequences within local storage; and
in response to not being able to identify the recovery sequences in local storage, searching for the recovery sequences that correspond to the failure from a support site, downloading a found recovery sequence at the support site, and executing the found recovery sequence at the IHS.

13. The method of claim 1, further comprising:
in response to a detected failure and not having access to an appropriate recovery sequence, placing the IHS into a self-healing mode;
said placing the IHS within a self-healing mode further comprises:
initiating an orderly shutdown of the information handling system; and
wherein when the information handling system cannot initiate an orderly shutdown, the information handling system is forced to shut down.

14. An information handling system (IHS) comprising:
a central processing unit (CPU);
at least one component that operates based on execution of a corresponding firmware component;
a local storage facility that stores executable firmware utilized to operate the at least one component; and
a hierarchical recovery and learning system/module comprising:
a failure detection mechanism that detects a failure of a firmware component in the information handling system; and
a hierarchical failure recovery mechanism that:
initiates a hierarchical failure recovery by executing at least one recovery sequence from a set of hierarchically ordered recovery sequences, corresponding to the detected failure;
following execution of a recovery sequence, performs, before executing a next recovery sequence, an evaluating to determine whether the detected failure was corrected by executing the recovery sequence;
in response to the failure not being corrected by executing the set of hierarchically ordered recovery sequences, dynamically generates at least one new recovery sequence using commands selected from at least one of the previously executed recovery sequences in order to extend the set of hierarchically ordered recovery sequences, wherein the recovery mechanism selects a portion of commands from the at least one of the previously executed recovery sequences to create the at least one new sequence;
executes the at least one new recovery sequence; and
selectively orders the executable commands corresponding to each of the at least one new sequence, respectively, to provide at least one corresponding series of executable commands;
wherein each of the at least one series of executable commands differ from any other series of executable commands with respect to at least one of (a) constituent executable commands and (b) an ordering of the constituent executable commands, wherein each of the at least one series of executable commands is a corresponding new recovery sequence.

15. The IHS of claim 14, wherein the hierarchical failure recovery mechanism:
updates, based on performed evaluations, one or more metrics respectively associated with a success rate of the one or more executed recovery sequences relative to each other in resolving the detected failure, wherein the one or more metrics are utilized to provide an updated set of hierarchically ordered recovery sequences appropriate for addressing a future failure.

16. The IHS of claim 14, wherein the hierarchical failure recovery mechanism:
in response to the failure being corrected by executing the recovery sequence, dynamically initiates a learning mechanism that: records information about a respective failure and at least one corresponding recovery sequence; enables retrieval of the recorded information for report collection; and forwards the particular recovery sequence to a customer support site which subsequently provides the recovery sequence for download to other systems.

17. The IHS of claim 14, wherein the hierarchical failure recovery mechanism:
retrieves the set of hierarchically ordered recovery sequences.

18. The IHS of claim 17, wherein the hierarchical failure recovery mechanism:
respectively orders selected portions of the executable commands by applying one or more metrics associated with at least one of success rates of various recovery sequences having executable commands, a type of failure of the firmware component, and a priority associated with the identified failure.

19. The IHS of claim 14, wherein the hierarchical failure recovery mechanism:
verifies whether the detected failure has been corrected by executing a new recovery sequence; and
in response to verifying that the detected failure has been corrected:
stores information associating the specific firmware failure with the new recovery sequence that corrected the failure; and
publishes an association of the detected failure and the new recovery sequence to a support site to share via download with other information handling systems.

20. The IHS of claim 14, wherein the recovery sequences are hierarchically ordered based on inter-layer system component dependencies, where various layers represent respective hierarchical levels.

21. The IHS of claim 14, wherein the hierarchical failure recovery mechanism:
in response to establishing that the new recovery sequence, having a specific series and group of commands, corrects the failure, records information identifying the new recovery sequence associated with the detected failure of the firmware component, and which includes a type of failure of the firmware component and a hierarchical level of the correction.

22. The IHS of claim 14, wherein in searching for the one or more recovery sequences that corresponds with the failure, the recovery mechanism:
identifies the recovery sequences within local storage; and
in response to not being able to identify the recovery sequences in local storage, searches for the recovery sequences that correspond to the failure from a support site, downloading a found recovery sequence at the support site, and executing the found recovery sequence at the IHS.

23. The IHS of claim 14, wherein the hierarchical failure recovery mechanism:
in response to a detected failure and not having access to an appropriate recovery sequence, places the IHS into a self-healing mode by:
initiating an orderly shutdown of the information handling system;
wherein when the information handling system cannot initiate an orderly shutdown, the information handling system is forced to shut down.

24. An information handling system (IHS) comprising:
a central processing unit (CPU);
at least one component that operates based on execution of a corresponding firmware component;
a local storage facility that stores executable firmware utilized to operate the at least one component; and
a hierarchical recovery and learning system/module comprising:
a failure detection mechanism that:
detects a failure of a firmware component in the information handling system by inserting at least one software assertion in the firmware component, wherein the software assertion can determine whether the firmware component is working properly; and
once a failure is detected:
identifies whether at least one hierarchical failure recovery sequence is available for that detected failure; and
generates an output indicating that the failure has been detected;
a hierarchical failure recovery mechanism that:
initiates a hierarchical failure recovery by executing at least one recovery sequence from a set of hierarchically ordered recovery sequences, corresponding to the detected failure;
following execution of a recovery sequence, performs, before executing a next recovery sequence, an evaluating to determine whether the detected failure was corrected by executing the recovery sequence;
in response to the failure not being corrected by executing the set of hierarchically ordered recovery sequences, dynamically generates at least one new recovery sequence using commands selected from at least one of the previously executed recovery sequences in order to extend the set of hierarchically ordered recovery sequences; and
executes the at least one new recovery sequence.

25. The IHS of claim 24, wherein generating an output indicating that a failure has been detected comprises one or more of:
displaying a message on a screen of the information handling system indicating that a failure has been detected and the information handling system is entering in the self-healing mode; and
activating an LED that indicates that the information handling system is in the self-healing mode.

26. The IHS of claim 25, wherein the hierarchical failure recovery mechanism:
in response to not being able to identify a hierarchical failure recovery sequence for the detected failure, performs one or more of:
prompts a user to manually select a hierarchical failure recovery sequence from a FFRSM database that may correct the failure;
prompts the user to select an information handling system shutdown; and
displays a message to indicate that the failure is not recoverable and a new hierarchical failure recovery sequence is required.

\* \* \* \* \*